(12) United States Patent
Khan et al.

(10) Patent No.: US 9,825,960 B2
(45) Date of Patent: Nov. 21, 2017

(54) SYSTEM AND METHOD PROVIDING AUTOMATIC PUSHDOWN HIERARCHICAL FILTERS

(71) Applicant: ORACLE INTERNATIONAL CORPORATION, Redwood Shores, CA (US)

(72) Inventors: Feroz Alam Khan, Bangalore (IN); Bhaskar Mathur, Bangalore (IN); Kant C. Patel, Fremont, CA (US)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 41 days.

(21) Appl. No.: 14/724,874

(22) Filed: May 29, 2015

(65) Prior Publication Data

US 2016/0352747 A1  Dec. 1, 2016

(51) Int. Cl.
*H04L 29/06* (2006.01)

(52) U.S. Cl.
CPC ........ *H04L 63/102* (2013.01); *H04L 63/0263* (2013.01); *H04L 63/16* (2013.01); *H04L 63/20* (2013.01)

(58) Field of Classification Search
CPC ....... H04L 63/102; H04L 63/20; H04L 63/16; H04L 63/0263

USPC ....................................................... 726/1, 11
See application file for complete search history.

(56) References Cited

U.S. PATENT DOCUMENTS

| | | | | |
|---|---|---|---|---|
| 7,260,840 | B2* | 8/2007 | Swander | H04L 63/0227 726/13 |
| 8,880,893 | B2* | 11/2014 | Moghe | G06F 21/316 709/223 |
| 2005/0022010 | A1* | 1/2005 | Swander | H04L 63/0218 726/4 |
| 2005/0114704 | A1* | 5/2005 | Swander | H04L 63/0263 726/4 |
| 2006/0248580 | A1* | 11/2006 | Fulp | H04L 63/20 726/11 |

* cited by examiner

*Primary Examiner* — Jeffrey D Popham
(74) *Attorney, Agent, or Firm* — Cooper Legal Group, LLC

(57) ABSTRACT

Systems, methods, and other embodiments are disclosed that are configured to generate a hierarchy of access rules in a protocol stack. Access rules corresponding to a first layer in a protocol stack are analyzed. The access rules determine, at the first layer, whether network sources are permitted access to a computing device. Dependent access rules are generated based at least in part on a combination of the access rules from the first layer. The dependent access rules are pushed down to a second layer in the protocol stack by implementing the dependent access rules at the second layer to determine, at the second layer, whether the network sources are permitted access to the computing device.

20 Claims, 7 Drawing Sheets

SYSTEM AND METHOD PROVIDING AUTOMATIC PUSHDOWN HIERARCHICAL FILTERS

BACKGROUND

A computerized machine on a network may be configured to accept or reject communications from various other machines on the network. For example, it is desirable to reject packets or connections coming into a machine, as early as possible, from nodes that are not allowed access by any application or feature on that machine. However, the policy to decide which machines are allowed access is typically dictated by applications and features at upper layers of a protocol stack (e.g., an application layer). In typical scenarios, applications read data and discard packets or connections based on the configured rules and policies.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments one element may be designed as multiple elements or that multiple elements may be designed as one element. In some embodiments, an element shown as an internal component of another element may be implemented as an external component and vice versa. Furthermore, elements may not be drawn to scale.

DETAILED DESCRIPTION

Figure 1:
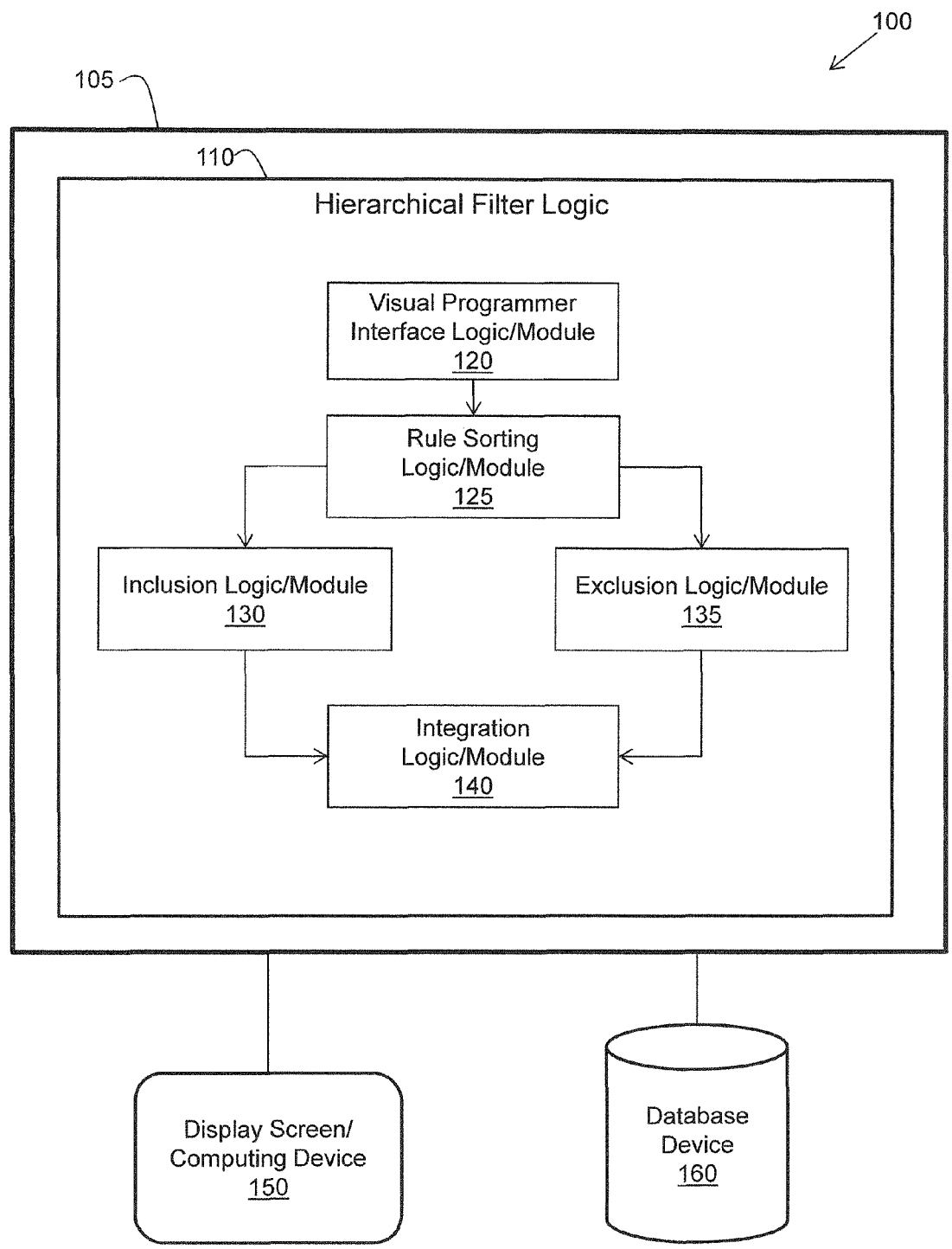
FIG. 1 illustrates one embodiment of a computer system, having a computing device configured with a hierarchical filter logic.

Systems, methods, and other embodiments are disclosed for providing automatic pushdown of hierarchical filters in a protocol stack. Example embodiments are discussed herein with respect to a computerized system that implements a hierarchical filter logic to define access to the computerized system at various layers of the protocol stack.

In one embodiment, a hierarchical filter logic is disclosed that is configured to realize cost savings and enhance security by pushing down upper layer rules to lower layers in a protocol stack (e.g., from an application layer to a session layer, then from the session layer to an IP layer). In general, each layer in the protocol stack is provided with a set of filters or rules that are derived from the filters or rules from the layer above. Since the rules from a given layer in a protocol stack are derived from the rules from the layer above, the rules for the various layers may be similar in some ways and different in other ways. Examples of deriving rules are discussed later herein.

An example of a protocol stack is defined in the OSI (Open Systems Interconnection) model. The OSI model has seven (7) layers including, from the highest layer to the lowest layer, an application layer (layer seven), a presentation layer (layer six), a session layer (layer five), a transport layer (layer four), a network layer (layer three), a datalink layer (layer two), and a physical layer (layer one). All of the issues related to communications are addressed by specific protocols operating at different layers in the OSI model. Other types of protocol stacks are possible as well, in accordance with various embodiments.

When a node (a network source) attempts to access a computerized machine over a network, the computerized machine may grant or deny access to the node. That is, the computerized machine may or may not allow the node to make a network connection with the computerized machine via the network and communicate packets of information to the computerized machine. In accordance with one embodiment, a node may be granted or denied access by the computerized machine at one or more of the layers in the protocol stack. Packets from a node that is granted access at every layer are processed through all of the layers of the protocol stack, from the lowest layer (e.g., the physical layer) to the highest layer (e.g., the application layer). Ideally, if a node is going to be denied access, the denial of access should occur at the lowest possible layer in the protocol stack. In this manner, once a node is denied access at a particular layer, the higher layers in the protocol stack do not have to waste time and resources processing packets from the node.

For example, a computerized machine may be running multiple applications, with each application being configured with a different set of access rules identifying IP addresses that are allowed access to the machine. In one embodiment, a lower layer filter can be derived as a union of the rules associated with all the IP addresses that are allowed access across different applications. For excluded nodes (i.e, nodes to be denied access), a lower layer filter can be derived as an intersection of excluded nodes across applications. The derived filters can be applied at the lower layer, thereby reducing the processing overhead for packets coming from IP addresses that are not allowed to access any application on the machine.

Upper layer filters (e.g., application layer filters) may be dynamic in nature and may keep changing with time. Furthermore, new applications may be started, or running applications may get stopped on the machine at any time. In one embodiment, a machine may have a daemon process running which continually derives the lower layer filters based on upper layer rules and keeps updating a kernel with the set of IP's allowed for the machine. Such updates may be performed in response to ongoing changes on the system.

For example, pushdown of hierarchical filters may be applied to any process that supports multiple services through common listen endpoints where each service allows a different set of IP addresses. In such a case, at the socket level, a new filter can be created that is a union of access rules identifying all IP addresses allowed in the process across all services. With a new filter at the socket level, the filtering process can avoid any processing for packets from IP addresses that are not allowed access to any service. In one embodiment, a filter that is pushed down to a lower layer in the protocol stack is derived from one or more filters at a higher layer in the protocol stack by, for example, a function that is applied to the filters at the higher layer. Examples of applying such a function are discussed later herein.

The following terms are used herein with respect to various embodiments.

The term "access rule", as used herein, refers to a restriction that determines if and how a computerized machine can be accessed by another computerized machine or node on a network. For example, a first access rule of a first computerized machine may allow a second computerized machine to access a first application running on the first computerized machine. A second access rule of the first computerized machine may not allow the second computerized machine to access a second application running on the first computerized machine.

The term "protocol stack", as used herein, refers to an implementation of a computer networking protocol suite. The suite defines the protocols and the stack is the implementation (e.g., in software) of the protocols. A protocol stack is modularized into protocol modules. Each protocol module usually communicates with two other protocol modules which are commonly referred to as layers in the stack. A lowest protocol layer may deal with lower level, physical interaction of the hardware. Higher protocol layers add more features. User applications usually deal only with the topmost layers of the protocol stack.

The term "layer", as used herein, refers to one of a plurality of protocol modules organized in a protocol stack.

The term "network source", as used herein, refers to a node on a computer network which may attempt to access a computerized machine, having access rules, on the computer network.

The term "layer feature", as used herein, refers to some function of a protocol layer of a computerized machine on a computer network. For example, a layer feature may be an application or a service of an application layer of a protocol stack. A layer feature may be a socket of a session layer of a protocol stack.

The term "access type", as used herein, refers to a category of admittance provided by an access rule of a computerized machine on a computer network. For example, an access rule may be configured as an inclusion access type, positively defining the IP address of a node on a computer network that is allowed to access a particular layer feature (e.g., a service) of a computerized machine on the computer network. Alternatively, an access rule may be configured as an exclusion access type, positively defining the IP address of a node on a computer network that is not allowed to access a particular layer feature (e.g., an application) of a computerized machine on the computer network. Other access types may be possible as well.

The term "filter", as used herein, refers to a plurality of access rules at a layer feature of a layer in a protocol stack. The terms "filter" and "access rules" may be used interchangeably herein.

FIG. 1 illustrates one embodiment of a computer system 100, having a computing device 105 configured with a hierarchical filter logic 110. For example, in one embodiment, the hierarchical filter logic 110 may be part of a larger computer application configured to provide access security to the computer system 100. The hierarchical filter logic 110 is configured to computerize the process of providing access security at different layers in a protocol stack.

The embodiments described herein allow for the automatic, hierarchical generation of access filters at various layers in a protocol stack. Access rules may be defined at a higher layer (e.g., at an application layer in the protocol stack such as layer seven in the OSI model). For example, the access rules may be manually defined (e.g., programmed) by a user at the higher layer. The hierarchical filter logic 110 can then automatically derive access rules for a next lower layer based on the access rules for the higher layer. Such a process may be automatically repeated for each layer below the higher layer in the protocol stack. That is, access rules for any given layer may be derived from the access rules for a layer immediately above the given layer. Again, the resultant access rules for a given layer may not be exactly the same as the access rules for the layer immediately above the given layer.

With reference to FIG. 1, in one embodiment, the hierarchical filter logic 110 is implemented on the computing device 105 and includes logics for implementing various functional aspects of the hierarchical filter logic 110. In one embodiment, the hierarchical filter logic 110 includes visual programmer interface logic 120 (e.g., a visual programmer interface module), rule sorting logic 125 (e.g., a rule sorting module), inclusion logic 130 (e.g., an inclusion module), exclusion logic 135 (e.g., an exclusion module), and integration logic 140 (e.g., an integration module).

The computer system 100 also includes a display screen 150 operably connected via an operable connection to the computing device 105. In accordance with one embodiment, the display screen 150 is implemented to display views of and facilitate programmer (user) interactions with a graphical user interface (GUI) generated by the visual programmer interface logic 120 for viewing and updating information associated with network access. The graphical user interface may be associated with a hierarchical filter application and the visual programmer interface logic 120 may be configured to generate the graphical user interface.

In one embodiment, the computer system 100 is a centralized server-side application that provides at least the functions disclosed herein and that is accessed by many users via computing devices/terminals communicating with the computer system 100 (functioning as the server) over a computer network. Thus the display screen 150 may represent multiple computing devices/terminals that allow users to access and receive services from the hierarchical filter logic 110 via networked computer communications.

In one embodiment, the computer system 100 further includes at least one database device 160 operably connected via an operable connection to the computing device 105 and/or a network interface to access the database device 160 via a network connection. For example, in one embodiment, the database device 160 is operably connected to the visual programmer interface logic 120 via an operable connection. In accordance with one embodiment, the database device 160 is configured to store and manage data structures (e.g., records of hierarchical access rules) associated with the hierarchical filter logic 110 in a database system (e.g., a computer security application).

Other embodiments may provide different logics or combinations of logics that provide the same or similar functionality as the hierarchical filter logic 110 of FIG. 1. In one embodiment, the hierarchical filter logic 110 is an executable application including algorithms and/or program modules configured to perform the functions of the logics. The application is stored in a non-transitory computer storage medium. That is, in one embodiment, the logics of the hierarchical filter logic 110 are implemented as modules of computer-executable instructions stored on a computer-readable medium.

Referring back to the logics of the hierarchical filter logic 110 of FIG. 1, in one embodiment, the visual programmer interface logic 120 is configured to generate a graphical user interface (GUI) to facilitate programmer interaction with the hierarchical filter logic 110. For example, the visual programmer interface logic 120 includes program code that generates and causes the graphical user interface to be displayed based on an implemented graphical design of the interface. In response to programmer actions and selections via the GUI, associated aspects of generating and editing access rules may be manipulated. Other computer user interfaces, in addition to a graphical user interface, may be provided as well. For example, other computer user interfaces may include a computer keyboard and a computer mouse. In general, in accordance with one embodiment, a computer user interface is configured to facilitate at least the defining (e.g., programming) and editing of access rules by a programmer.

In one embodiment, the visual programmer interface logic 120 is configured to facilitate receiving inputs and reading data in response to programmer actions. For example, the visual programmer interface logic 120 may facilitate selection, reading, inputting, and storing of access rules associated with one or more layers of a protocol stack. The access rules may be read into visual programmer interface logic 120, for example, from at least one data structure (e.g., from database device 160) associated with (and accessible by) a hierarchical filter application (e.g., the hierarchical filter logic 110) via the graphical user interface. Furthermore, the visual programmer interface logic 120 is configured to facilitate the outputting and displaying of, for example, a hierarchy of access rules (filters) via the graphical user interface on the display screen 150.

In one embodiment, rule sorting logic 125 is configured to sort access rules, associated with a layer in a protocol stack, according to layer feature and access type to form groups of sorted rules. The protocol stack may be associated with a computerized machine on a computer network that may grant or deny access to various other nodes (network sources) on the computer network. Access rules (filters) associated with the various layers of the protocol stack are used to grant or deny access to other nodes on the computer network. The access rules may be based on source identifiers of the other nodes such as, for example, IP addresses of the other nodes. Other types of source identifiers are possible as well such as, for example, a media access control (MAC) address and a source group identifier (SGID). Access rules may be based on other characteristics of the other nodes (e.g., a country within which a node exists, or an extension or a domain name associated with a node), in accordance with other embodiments.

In one embodiment, if a computerized machine is configured to pushdown access rules, then logic is configured to identify access rules from a set of rules assigned to a layer. The type of rule is determined from a definition of the rule as being an inclusion rule or an exclusion rule. When the access rules are identified, IP addresses are identified from each of the rules. The IP addresses determine the nodes to which the rules will apply.

For example, a first group of sorted rules may correspond to a layer feature (e.g., a first service) of an application associated with an application layer of the protocol stack. That same first group of sorted rules may also correspond to an inclusion access type, positively defining the IP addresses of nodes on the computer network that are allowed to access a particular layer feature (e.g., the first service) of the computerized machine on the computer network. In general, when a computerized machine allows access to a node, that node is permitted to connect to the computerized machine. Furthermore, the computerized machine will process packets of information received from the allowed node, at least through the layers of the protocol stack that allow access.

Similarly, a second group of sorted rules may correspond to a layer feature (e.g., a second service) of the application associated with the application layer of the protocol stack. That same second group of sorted rules may also correspond to an inclusion access type, positively defining the IP addresses of nodes on the computer network that are allowed to access a particular layer feature (e.g., the second service) of the computerized machine on the computer network.

The inclusion logic 130 is configured to generate data identifying allowed nodes to be allowed access by a layer in a protocol stack, based at least in part on access rules for a previous higher layer in the protocol stack. For example, the inclusion logic 130 may be configured to receive the first and second groups of sorted rules, corresponding to the first and second services in the application of the application layer in the protocol stack, from the rule sorting logic 125. The inclusion logic 130 may operate on the first and second groups of sorted rules (associated with an inclusion access type) to generate data identifying the allowed network sources at a second lower layer (e.g., a session layer) in the protocol stack.

In accordance with one embodiment, the inclusion logic 130 is configured to perform a union operation on at least two groups of sorted rules, associated with one layer, to generate data identifying allowed network sources at a next lower layer. In one embodiment, the rules may simply indicate to allow access to certain specified IP addresses. Therefore, even though the union operation is being performed on the rules, the union operation is effectively being performed on the IP addresses.

A union operation is a process defined in set theory. As an example, one group of sorted rules may include access rules A, B, and C for a first service of the application layer. Another group of sorted rules may include access rules D, E, and F for a second service of the application layer. The resulting group of rules for a next lower session layer may include access rules A, B, C, D, E, and F, based on a union operation performed by the inclusion logic. For example, access rules A, B, C, D, E, and F allow access to a first plurality of nodes (network sources), as identified by IP addresses, on a computer network at the session layer.

Other groups of sorted rules may be formed by the rule sorting logic 125 corresponding to layer features (e.g., sockets) of the session layer of the protocol stack. Those same other groups of sorted rules may also correspond to an exclusion access type, positively defining the IP addresses of nodes on the computer network that are not allowed to access particular layer features (e.g., the sockets) of the computerized machine on the computer network.

In one embodiment, the exclusion logic 135 is configured to generate data identifying denied network sources to be denied access by a layer in a protocol stack, based at least in part on access rules for a previous higher layer in the protocol stack. For example, the exclusion logic 135 may be configured to receive groups of sorted rules, corresponding to a layer (e.g., the session layer) in the protocol stack, from the rule sorting logic 125. The exclusion logic 135 may operate on the groups of sorted rules (associated with an exclusion access type) to generate data identifying the denied network sources at a next lower layer (e.g., an IP layer) in the protocol stack. An IP layer may also be known as an internet layer or a network layer in some protocol stacks.

In accordance with one embodiment, the exclusion logic 135 is configured to perform an intersection operation on at least two groups of sorted rules, associated with one layer, to generate data identifying the denied network sources at a next lower layer. In one embodiment, the rules may simply indicate to deny access to certain specified IP addresses. Therefore, even though the intersection operation is being performed on the rules, the intersection operation is effectively being performed on the IP addresses.

An intersection operation is a process defined in set theory. As an example, one group of sorted rules may include access rules Q, R, and S for a first socket of the session layer. Another group of sorted rules may include access rules R, S, and T for a second socket of the session layer. The resulting group of rules for a next lower IP layer may include access rules R and S, based on an intersection operation performed by the exclusion logic 135. For example, access rules R and S deny access to a second plurality of nodes (network sources), as identified by IP addresses, on a computer network at the IP layer.

In one embodiment, integration logic 140 is configured to combine or integrate the data identifying the allowed nodes with the data identifying the denied nodes to form an access filter for a layer in the protocol stack. Again, the data identifying the allowed nodes and the data identifying the denied nodes are derived from the access rules for a next higher layer in the protocol stack (e.g., by functions performing union operations, intersection operations, or some other type of set theory operation).

In this manner, a filter for a layer in a protocol stack may be formed. From the point of view of a computerized machine on a computer network, the filter allows and denies access requests from various nodes (network sources) on the computer network at that layer in the protocol stack. Packets from denied nodes will not be processed by higher layers in the protocol stack, and connections from denied nodes may be denied access at the layer having the filter.

Figure 2:
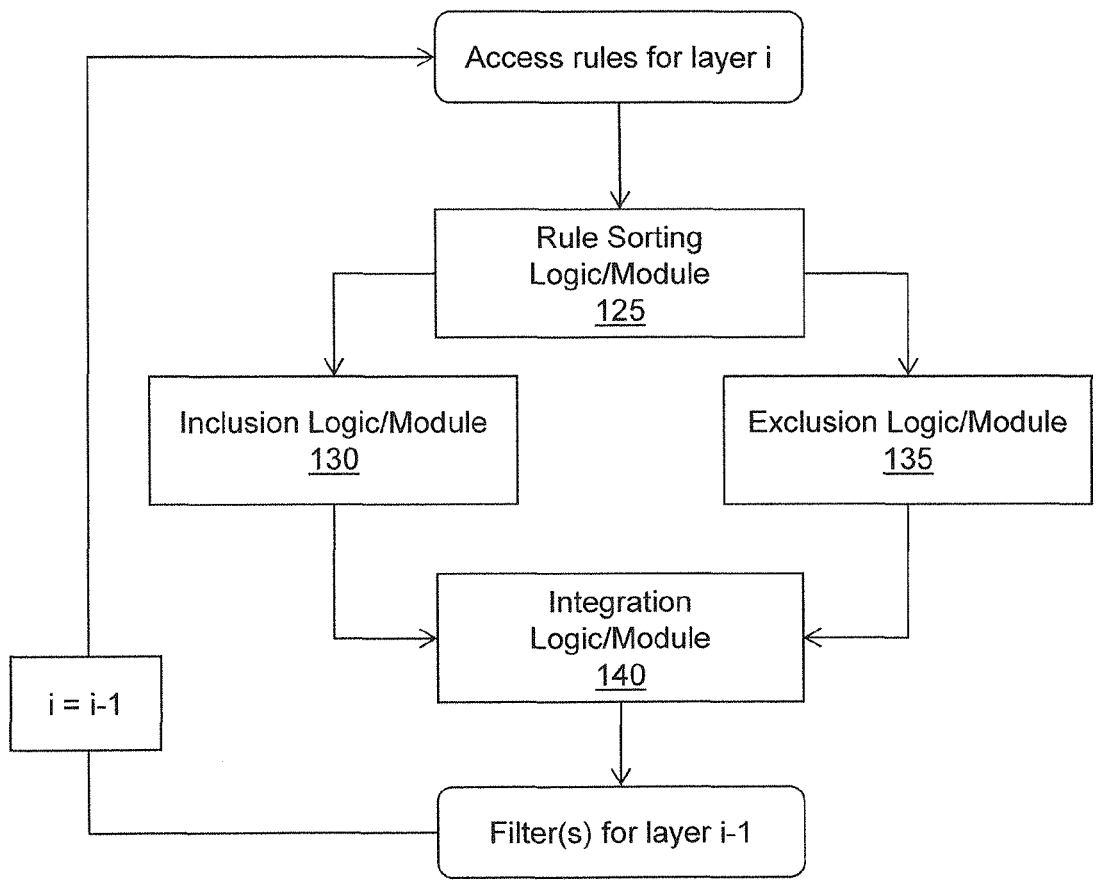
FIG. 2 illustrates one embodiment of a processing flow through logics of the hierarchical filter logic of FIG. 1 to derive an access filter for a lower layer in a protocol stack from a higher layer in the protocol stack.

FIG. 2 illustrates one embodiment of a processing flow through logics of the hierarchical filter logic 110 of FIG. 1 to derive an access filter for a lower layer in a protocol stack from access rules for a higher layer in the protocol stack. As seen in FIG. 2, access rules for a particular access layer i (e.g., an application layer) are input to the rule sorting logic 125. The access rules are sorted according to layer feature and access type by the rule sorting logic 125. Some of the sorted access rules may be input to the inclusion logic 130 and others of the sorted access rules may be input to the exclusion logic 135. The inclusion logic 130 generates access rules for a next lower layer i−1 (e.g., a session layer) in the protocol stack, defining nodes to be allowed access at the next lower layer i−1. The exclusion logic 135 generates access rules for the next lower layer i−1 in the protocol stack, defining nodes to be denied access at the next lower layer.

The access rules out of the inclusion logic 130 and the exclusion logic 135 may be input to the integration logic 140 and combined or integrated to form a filter for the next lower layer i−1. The resultant access rules for layer i−1 may be fed back and input to the rule sorting logic 125 such that the process is repeated to form access rules for still a further lower layer (e.g., an IP layer) in the protocol stack. The processing flow of FIG. 2 may be continued until all layers in the protocol stack have been considered. In this manner, a hierarchical set of access filters may be derived for a computerized machine on a computer network.

Figure 3:
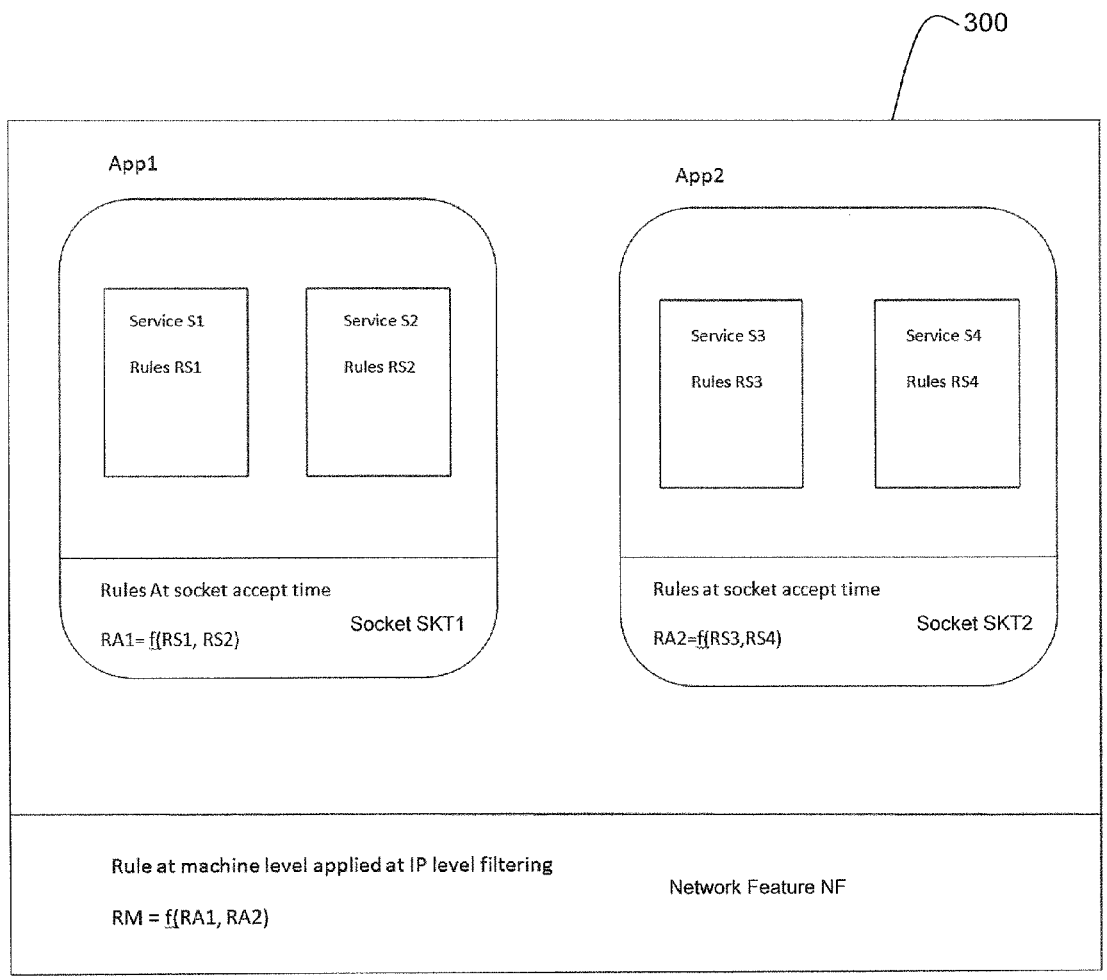
FIG. 3 illustrates one embodiment of a layered protocol architecture on a machine having a hierarchical structure of access rules generated by the hierarchical filter logic of the computer system of FIG. 1.

FIG. 3 illustrates one embodiment of a layered protocol architecture on a computerized machine 300 having a hierarchical structure of access rules generated by the hierarchical filter logic 110 of the computer system 100 of FIG. 1. The layered protocol architecture includes a first application App1 and a second application App2 at an application layer in a protocol stack. App1 includes a first service S1 and a second service S2. App 2 includes a third service S3 and a fourth service S4. S1, S2, S3, and S4 are layer features of the application layer. S1 has access rules RS1 and S2 has access rules RS2. S3 has access rules RS3 and S4 has access rules RS4. For example, in accordance with one embodiment, the access rules RS1, RS2, RS3, and RS4 are defined by a programmer at the application layer level via interaction with a graphical user interface provided by the visual programmer interface logic 120.

The layered protocol architecture also includes a first socket SKT1 and a second socket SKT2 at a session layer in the protocol stack. SKT 1 and SKT 2 are layer features of the session layer. Access rules RA1 for SKT1 are automatically derived from access rules RS1 and RS2 from the application layer. That is, RA1 is a function of RS1 and RS2, or RA1=$f$(RS1, RS2). Access rules RA2 for SKT2 are automatically derived from access rules RS3 and RS4 from the application layer. That is, RA2 is a function of RS3 and RS4, or RA2=$f$(RS3, RS4). In accordance with one embodiment, the function $f$ is a union operation. In accordance with another embodiment, the function $f$ is an intersection operation. In accordance with yet another embodiment, the function $f$ is a combination of a union operation and an intersection operation. Other functions (e.g., from set theory) are possible as well, in accordance with other embodiments.

The layered protocol architecture also includes a network feature NF at an IP layer. NF is a layer feature of the IP layer. Access rules RM for NF are automatically derived from access rules RA1 and RA2 from the session layer. That is, RM is a function of RA1 and RA2, or RM=$f$(RA1, RA2). In accordance with one embodiment, the function $f$ is a union operation. In accordance with another embodiment, the function $f$ is an intersection operation. In accordance with yet another embodiment, the function $f$ is a combination of a union operation and an intersection operation. Other functions (e.g., from set theory) are possible as well, in accordance with other embodiments. In this manner, a hierarchy of access rules (filters) is formed for a computerized machine operating on a computer network.

Figure 4:
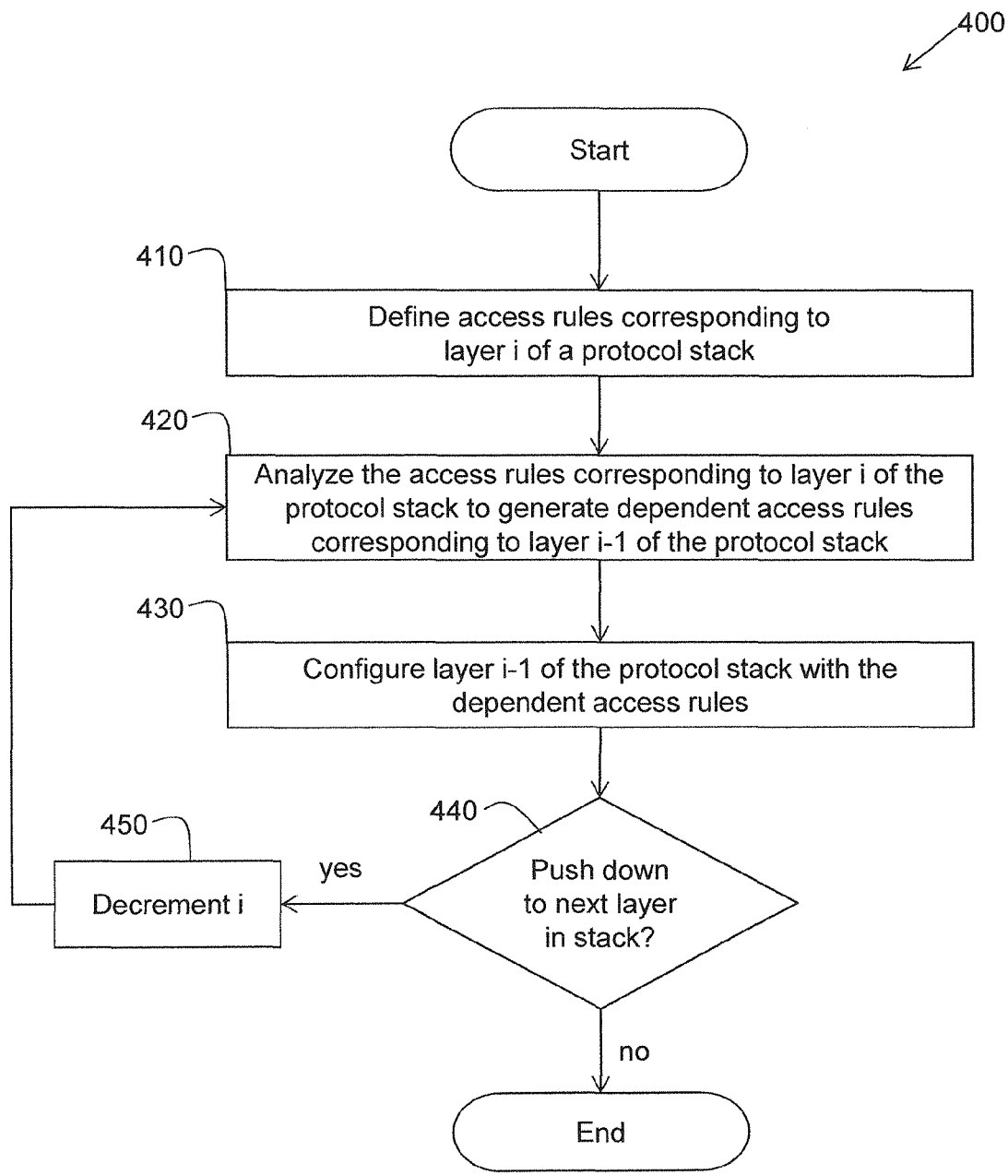
FIG. 4 illustrates one embodiment of a method, which can be performed by the hierarchical filter logic of the computer system of FIG. 1, for generating a hierarchy of access rules at different layers in a protocol stack.

FIG. 4 illustrates one embodiment of a method 400, which can be performed by the hierarchical filter logic 110 of the computer system 100 of FIG. 1, for generating a hierarchy of access rules at different layers in a protocol stack. Method 400 describes operation of the hierarchical filter logic 110 and is implemented to be performed by the hierarchical filter logic 110 of FIG. 1, or by a computing device configured with algorithms of the method 400. For example, in one embodiment, method 400 is implemented by a computing device configured to execute a computer application. The computer application is configured to process data in electronic form and includes stored executable instructions that perform the functions of at least the method 400 and/or its equivalents.

Method 400 will be described from the perspective that access rules are configured by a programmer at a high level in a protocol stack. In one embodiment, the hierarchical filter logic 110 facilitates the configuring of the access rules by the programmer. The access rules may be configured by the programmer using a programming language. The rules may then be assigned and operated/executed at one of the high levels in the stack. During operation/execution of the stack, data that is processed through that layer is subjected to the rules operating in that layer.

Once the access rules are configured at the high level, other access rules may be automatically derived, from the access rules at the high level, for lower layers in the protocol stack. The lower layer access rules may be automatically derived one layer at a time. That is, for a given lower layer, access rules for that given lower layer are derived from the layer immediately above the given lower layer according to a function and, therefore, are dependent from the access rules for the higher layers.

Upon initiating method 400, at block 410, access rules are defined (e.g., programmed) corresponding to a layer i (e.g., an application layer) of a protocol stack, where i is an integer number (e.g., seven, corresponding to layer seven of the protocol stack). In one embodiment, the protocol stack is an internet protocol stack. Layer i may include at least one layer feature (e.g., a service of an application). In accordance with one embodiment, the visual programmer interface logic 120 of the hierarchical filter logic 110 facilitates the defining of the access rules at layer i. For example, a user may type in, configure, or program the access rules via a graphical user interface provided by the visual programmer interface logic 120. Alternatively, access rules may be read in from the database device 160 and then edited by the user via the graphical user interface displayed on the display screen 150 by the visual programmer interface logic 120 to define the access rules for layer i.

At block 420, the access rules for layer i are analyzed to generate dependent access rules corresponding to layer i−1 (e.g., layer six) of the protocol stack (i.e., the next lower layer, where layer i−1 is beneath layer i in the protocol stack). For example, in one embodiment, the access rules from a layer are identified, the rule type (type of access) is determined, the access rules are sorted (e.g., based on type of access), IP addresses are identified from the sorted rules, and the rules/IP addresses are processed using a function to generate the dependent access rules (e.g., a combination of the access rules from layer i). Layer i−1 may include at least one layer feature (e.g., a socket). In accordance with one embodiment, block 420 is performed by a combination of rule sorting logic 125, inclusion logic 130, and exclusion logic 135 of the hierarchical filter logic 110.

At block 430, layer i−1 of the protocol stack is configured with the dependent access rules to allow and deny access to nodes (network sources) at layer i−1. That is, the dependent access rules are "pushed down" to layer i−1 by implementing the dependent access rules at layer i−1 to determine, at layer i−1, whether network sources are permitted access to a computing device. Permitting access to a computerized machine by a node involves allowing the node to make a network connection with the computerized machine via a network and communicate packets of information to the computerized machine. In accordance with one embodiment, a node may be granted or denied access by a computerized machine at one or more of the layers in the protocol stack. Packets from a node that is granted access at every layer are processed through all of the layers of the protocol stack, from the lowest layer (e.g., the physical layer) to the highest layer (e.g., the application layer). Ideally, if a node is going to be denied access, the denial of access should occur at the lowest possible layer in the protocol stack. In this manner, once a node is denied access at a particular layer, the higher layers in the protocol stack do not have to waste time and resources processing packets from the node. In accordance with one embodiment, block 430 is performed by the integration logic 140 of the hierarchical filter logic 110.

At block 440, a decision is made with respect to pushing down the access rules further to the next lower layer in the protocol stack. If the decision is "no", then method 400 ends. If the decision is "yes", method 400 proceeds to block 450. At block 450, i is decremented (e.g., i goes from seven to six) such that layer i corresponds to the layer for which the dependent access rules were just generated. In one embodiment, the decision may be "yes" by checking and verifying that there is a next lower layer in the stack (e.g., checking that the lowest layer in the protocol stack, layer one, has not been reached). In another embodiment, the decision may be "yes" by checking and verifying that a predefined layer (e.g., layer three) for which to push access rules down to has not been reached. Otherwise, the decision is "no". Other criteria for making the decision with respect to pushing down to a next layer in the stack are possible as well, in accordance with various embodiments. In one embodiment, when access rules are pushed down to a next lower layer in a protocol stack, the access rules for the higher layers remain intact and operational. Thus, a hierarchy of access rules (filters) is created.

From block 450, method 400 loops back to block 420 where a new set of dependent access rules are generated for layer i−1 (e.g., layer five). In one embodiment, method 400 may remain in such a looped state between block 420 and block 450 until access rules have been pushed down to the lowest layer (e.g., layer one) in the protocol stack. In this manner, access rules for one or more layers in the protocol stack may be automatically generated based at least in part on the originally defined access rules for an upper layer.

Figure 5:
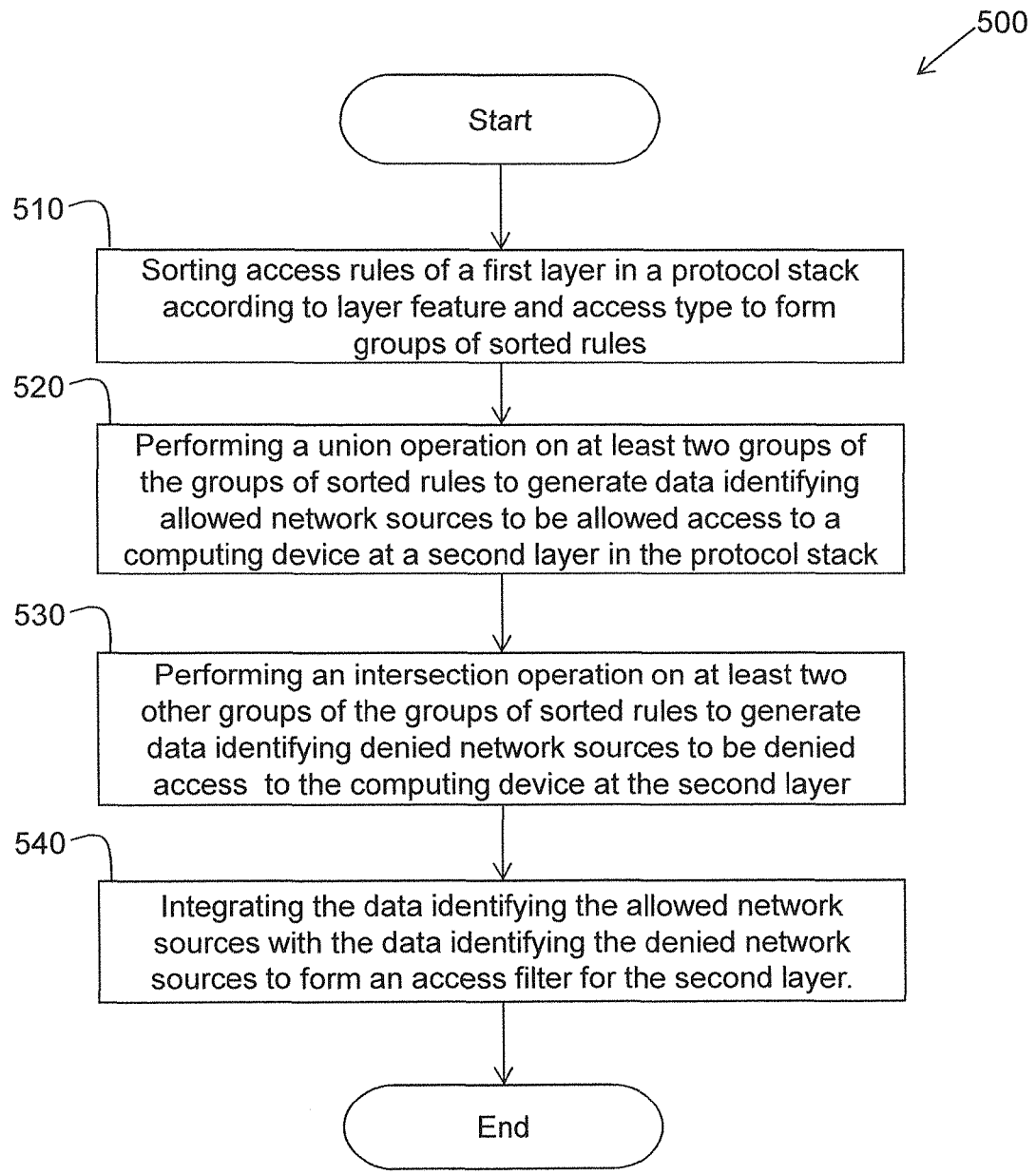
FIG. 5 illustrates one embodiment of a method, which can be performed by the hierarchical filter logic of the computer system of FIG. 1, for deriving access rules for a lower layer in a protocol stack from access rules at a higher layer in the protocol stack.

FIG. 5 illustrates one embodiment of a method 500, which can be performed by the hierarchical filter logic 110 of the computer system 100 of FIG. 1, for deriving access rules for a lower layer in a protocol stack from access rules at a higher layer in the protocol stack. Method 500 describes operation of the hierarchical filter logic 110 and is implemented to be performed by the hierarchical filter logic 110 of FIG. 1, or by a computing device configured with algorithms of the method 500. For example, in one embodiment, method 500 is implemented by a computing device configured to execute a computer application. The computer application is configured to process data in electronic form and includes stored executable instructions that perform the functions of at least the method 500 and/or its equivalents.

Method 500 will be described from the perspective that access rules are defined by a user at a high level in a protocol stack. In one embodiment, the hierarchical filter logic 110 facilitates the defining of the access rules by the user. Once the access rules are defined at the high level, other access rules may be automatically derived, from the access rules at the high level, for lower layers in the protocol stack. The lower layer access rules may be automatically derived one layer at a time. That is, for a given lower layer, access rules for that given lower layer are derived from the layer immediately above the given lower layer and, therefore, are dependent from the access rules for the higher layers.

Upon initiating method 500, at block 510, access rules of a first layer in a protocol stack are sorted according to a layer feature and an access type to form groups of sorted rules. For example, the first layer may be an application layer and the layer features may be one or more services of one or more applications. The access types may be inclusion and exclusion access types. In one embodiment, the rule sorting logic 125 of the hierarchical filter logic 110 performs block 510.

In one embodiment, an access rule that is an inclusion access type for a computerized machine may be configured to allow network connections from one or more nodes on a network to the computerized machine. Also, an access rule for a computerized machine that is associated with a layer in a protocol stack may allow processing of packets received from the one or more nodes by the layer in the protocol stack associated with the access rule.

In one embodiment, an access rule that is an exclusion access type for a computerized machine may be configured to deny network connections from one or more nodes on a network to the computerized machine. Also, an access rule for a computerized machine associated with a layer in a protocol stack may prevent the processing of packets received from the one or more nodes by higher layers in the protocol stack.

At block 520, a union operation is performed on at least two groups of the sorted rules to generate data identifying allowed nodes (network sources) to be allowed access to the computerized machine at a second layer in the protocol stack. The second layer may be, for example, a session layer in the protocol stack. For example, suppose one sorted group of access rules includes access rules A, B, and C for a first service of a first application. Another sorted group of access rules includes access rules C, D, and E for a second service of the first application. Suppose both groups are rules of an inclusion access type, which identify nodes (e.g., by IP address) that are allowed access. The union operation results in the grouping A, B, C, D, and E (i.e., the union of (A, B, C) and (C, D, E)) having data identifying allowed nodes for the second layer. In one embodiment, the inclusion logic 130 of the hierarchical filter logic 110 performs block 520.

At block 530, an intersection operation is performed on at least two other groups of the sorted rules to generate data identifying denied nodes (network sources) to be denied access to the computerized machine at the second layer. For example, suppose one sorted group of access rules includes access rules Q, R, and S for a first service of a second application. Another sorted group of access rules includes access rules R, S, and T for a second service of the second application. Suppose both groups are rules of an exclusion access type, which identify nodes that are not allowed access to the second layer. The intersection operation results in the grouping R and S (i.e., the intersection of (Q, R, S) and (R, S, T)) having data identifying denied nodes for the second layer. In one embodiment, the exclusion logic 135 of the hierarchical filter logic 110 performs block 530.

At block 540, an integration operation is performed to combine or integrate the data identifying the allowed nodes with the data identifying the denied nodes to form an access filter for the computerized machine at the second layer (e.g., as part of "pushing down" the dependent access rules to the second layer). For example, the resultant filter may be the combination of access rules A, B, C, D, and E (defining allowed nodes) and access rules R and S (defining denied nodes) for the second layer. In one embodiment, the integration logic 140 of the hierarchical filter logic 110 performs block 540.

In this manner, access rules at a lower layer in a protocol stack can be derived from access rules at a higher layer in the protocol stack. As a result, packets and connections from unwanted/unauthorized nodes (network sources) can be filtered out at the lower layer, relieving the higher layer from having to perform processing of data or connection requests associated with unwanted nodes.

Figure 6:
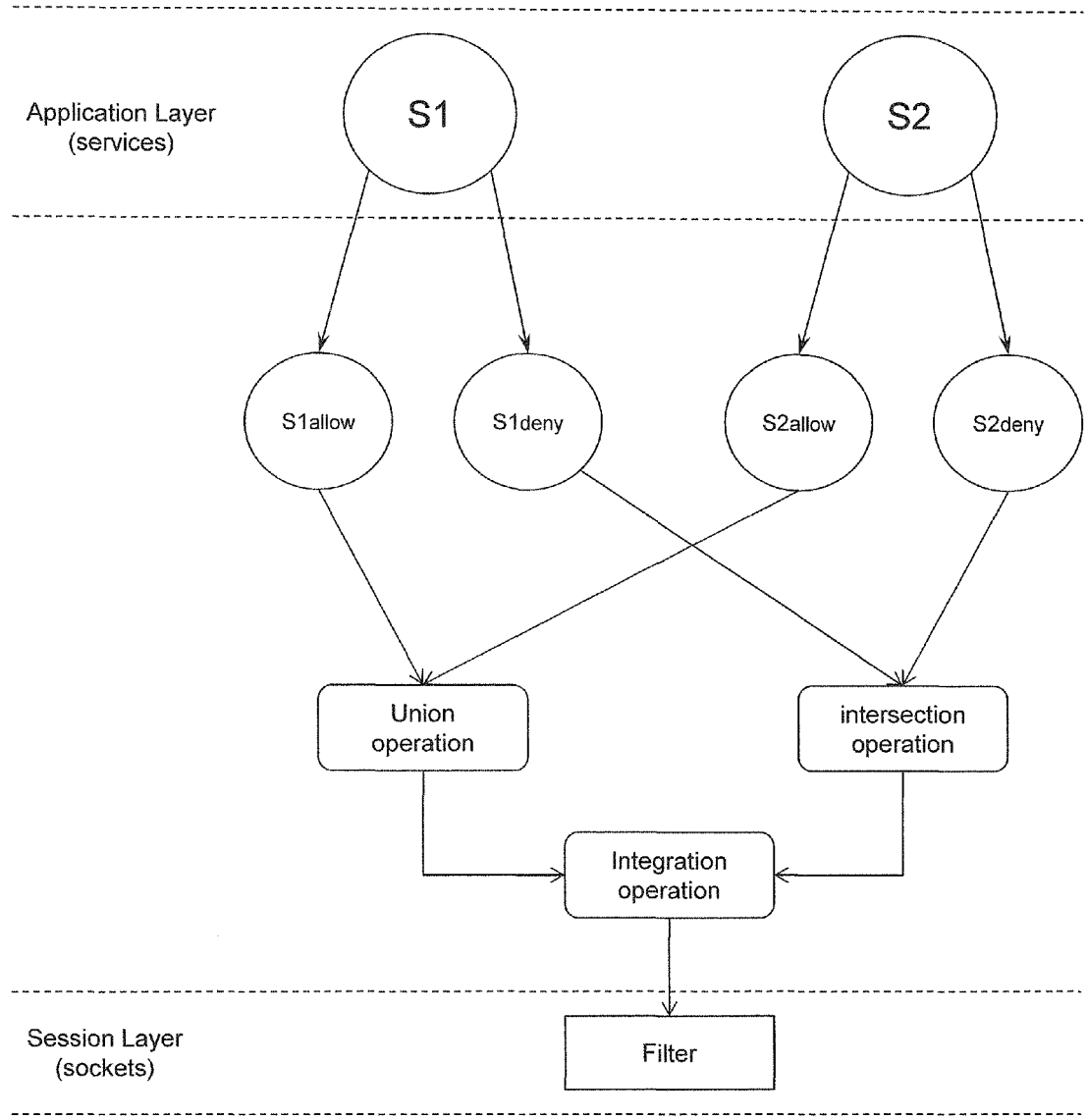
FIG. 6 illustrates a diagram showing one example embodiment of applying the method of FIG. 5 to a portion of the layered protocol architecture of FIG. 3.

FIG. 6 illustrates a diagram showing one example embodiment of applying the method 500 of FIG. 5 to a portion of the layered protocol architecture of FIG. 3. Services S1 and S2 are associated with an application layer of a protocol stack. In one embodiment, the rule sorting logic 125 of the hierarchical filter logic 110 sorts the access rules associated with S1 and S2 to form groups of sorted access rules $S1_{allow}$, $S1_{deny}$, $S2_{allow}$, and $S2_{deny}$. Group $S1_{allow}$ has access rules associated with service S1 that define nodes that are allowed access to service S1. Similarly, group $S2_{allow}$ has access rules associated with service S2 that define nodes that are allowed access to service S2. Group $S1_{deny}$ has access rules associated with service S1 that define nodes that are not allowed access to service S1. Similarly, group $S2_{deny}$ has access rules associated with service S2 that define nodes that are not allowed access to service S2.

The sorted groups $S1_{allow}$ and $S2_{allow}$ are input to a union operation, and the sorted groups $S1_{deny}$ and $S2_{deny}$ are input to an intersection operation. The output of the union operation is an inclusion group of rules that define nodes that are allowed access to both service S1 and service S2. The output of the intersection operation is an exclusion group of rules that define nodes that are not allowed access to either service S1 or service S2. An integration operation is performed to combine the inclusion group of rules and the exclusion group of rules to form an access filter for a first socket SKT1 of a session layer of the protocol stack. Referring to FIG. 3, a similar process may be performed for services S3 and S4 of the application layer of the protocol stack to form an access filter for a second socket SKT2 of the session layer of the protocol stack.

In this manner, access rules at an application layer may be sorted according to layer feature (e.g., services) and access type (e.g., inclusion, exclusion) and processed to form a filter for a next lower layer (e.g., a session layer) in a protocol stack. Only packets and connections from nodes that are allowed access to at least one of the services provided by the application layer will get past the session layer.

Systems, methods, and other embodiments are disclosed that are configured to generate a hierarchy of access rules in a protocol stack. Access rules corresponding to a first layer in a protocol stack are analyzed. Dependent access rules are generated corresponding to a second lower layer in the protocol stack based at least in part on the analyzing of the access rules of the first layer. The second layer in the protocol stack is configured with the dependent access rules to allow and/or deny access to a computing device by network sources at the second layer in the protocol stack. In one embodiment, the access rules are analyzed by sorting the access rules of the first layer according to a layer feature and an access type to form groups of sorted rules. A union operation is performed on at least two groups of the sorted rules to generate data identifying network sources (nodes) to be allowed access to the computing device at the second layer. An intersection operation is performed on at least two other groups of the sorted rules to generate data identifying network sources (nodes) to be denied access to the computing device at the second layer. Just as for the first layer and the second layer, the process may be performed for the second layer and a third layer, and the third layer and a fourth layer, etc., until access rules (filters) are configured for a lowest layer of the protocol stack. In this manner, a hierarchy of access filters may be formed.

Computing Device Embodiment

Figure 7:
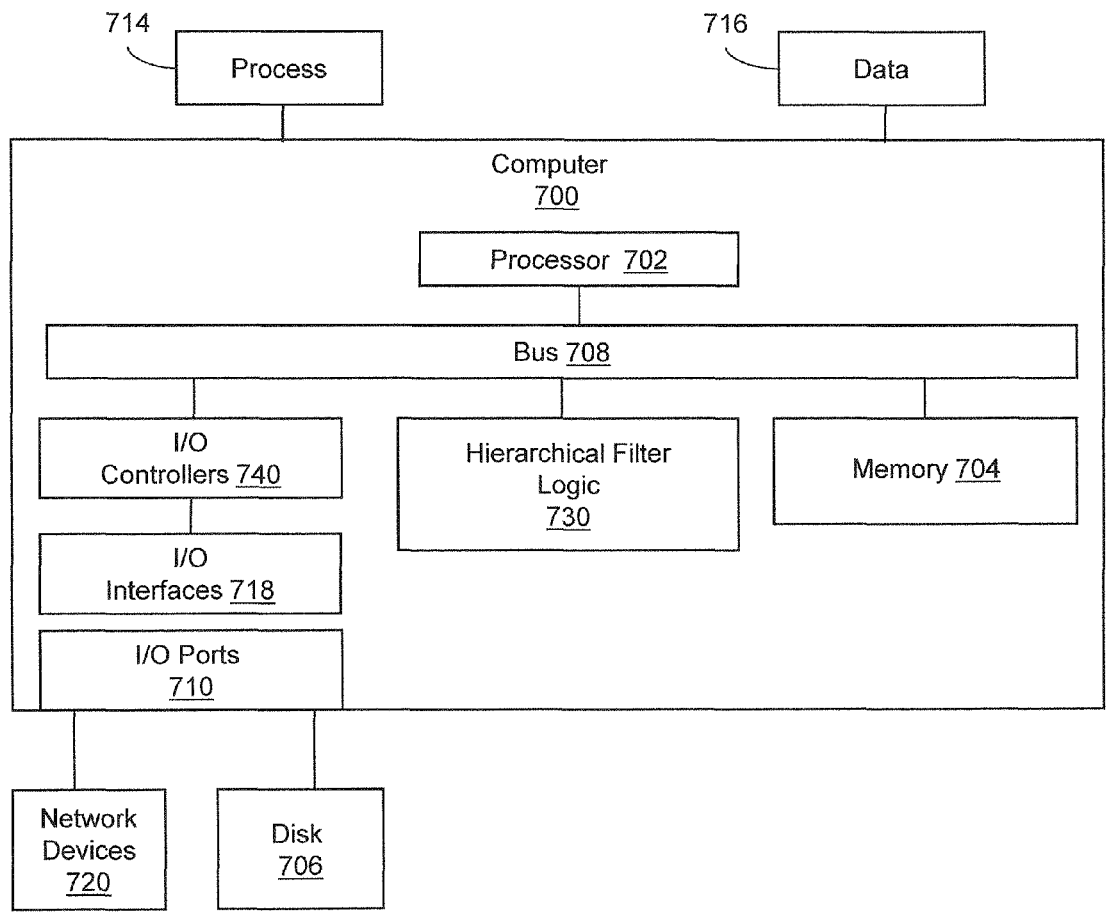
FIG. 7 illustrates one embodiment of a computing device upon which a hierarchical filter logic of a computing system may be implemented.

FIG. 7 illustrates an example computing device that is configured and/or programmed with one or more of the example systems and methods described herein, and/or equivalents. FIG. 7 illustrates one example embodiment of a computing device upon which an embodiment of a hierarchical filter logic may be implemented. The example computing device may be a computer 700 that includes a processor 702, a memory 704, and input/output ports 710 operably connected by a bus 708.

In one example, the computer 700 may include hierarchical filter logic 730 (corresponding to hierarchical filter logic 110 from FIG. 1) configured with a programmed algorithm as disclosed herein to automatically generate a hierarchy of access filters across layers of a protocol stack. In different examples, the logic 730 may be implemented in hardware, a non-transitory computer-readable medium with stored instructions, firmware, and/or combinations thereof. While the logic 730 is illustrated as a hardware component attached to the bus 708, it is to be appreciated that in other embodiments, the logic 730 could be implemented in the processor 702, a module stored in memory 704, or a module stored in disk 706.

In one embodiment, logic 730 or the computer 700 is a means (e.g., structure: hardware, non-transitory computer-readable medium, firmware) for performing the actions described. In some embodiments, the computing device may be a server operating in a cloud computing system, a server configured in a Software as a Service (SaaS) architecture, a smart phone, laptop, tablet computing device, and so on.

The means may be implemented, for example, as an ASIC programmed to facilitate the generation of a hierarchy of access filters. The means may also be implemented as stored computer executable instructions that are presented to computer 700 as data 716 that are temporarily stored in memory 704 and then executed by processor 702.

Logic 730 may also provide means (e.g., hardware, non-transitory computer-readable medium that stores executable instructions, firmware) for facilitating the automatic generation of a hierarchy of access rules for a protocol stack.

Generally describing an example configuration of the computer 700, the processor 702 may be a variety of various processors including dual microprocessor and other multi-processor architectures. A memory 704 may include volatile memory and/or non-volatile memory. Non-volatile memory may include, for example, ROM, PROM, and so on. Volatile memory may include, for example, RAM, SRAM, DRAM, and so on.

A disk 706 may be operably connected to the computer 700 via, for example, an input/output interface (e.g., card, device) 718 and input/output ports 710. The disk 706 may be, for example, a magnetic disk drive, a solid state disk drive, a floppy disk drive, a tape drive, a Zip drive, a flash memory card, a memory stick, and so on. Furthermore, the disk 706 may be a CD-ROM drive, a CD-R drive, a CD-RW drive, a DVD ROM, and so on. The memory 704 can store a process 714 and/or a data 716, for example. The disk 706 and/or the memory 704 can store an operating system that controls and allocates resources of the computer 700.

The computer 700 may interact with input/output devices via the i/o interface 718 and the input/output ports 710. Input/output devices may be, for example, a keyboard, a microphone, a pointing and selection device, cameras, video cards, displays, the disk 706, the network devices 720, and so on. The input/output ports 710 may include, for example, serial ports, parallel ports, and USB ports.

The computer 700 can operate in a network environment and thus may be connected to the network devices 720 via the i/o interface 718, and/or the i/o ports 710. Through the network devices 720, the computer 700 may interact with a network. Through the network, the computer 700 may be logically connected to remote computers. Networks with which the computer 700 may interact include, but are not limited to, a LAN, a WAN, and other networks.

Definitions and Other Embodiments

In another embodiment, the described methods and/or their equivalents may be implemented with computer executable instructions. Thus, in one embodiment, a non-transitory computer readable/storage medium is configured with stored computer executable instructions of an algorithm/executable application that when executed by a machine(s) cause the machine(s) (and/or associated components) to perform the method. Example machines include but are not limited to a processor, a computer, a server operating in a cloud computing system, a server configured in a Software as a Service (SaaS) architecture, a smart phone, and so on). In one embodiment, a computing device is implemented with one or more executable algorithms that are configured to perform any of the disclosed methods.

In one or more embodiments, the disclosed methods or their equivalents are performed by either: computer hardware configured to perform the method; or computer software embodied in a non-transitory computer-readable medium including an executable algorithm configured to perform the method.

While for purposes of simplicity of explanation, the illustrated methodologies in the figures are shown and described as a series of blocks of an algorithm, it is to be appreciated that the methodologies are not limited by the order of the blocks. Some blocks can occur in different orders and/or concurrently with other blocks from that shown and described. Moreover, less than all the illustrated blocks may be used to implement an example methodology. Blocks may be combined or separated into multiple actions/components. Furthermore, additional and/or alternative methodologies can employ additional actions that are not illustrated in blocks. The methods described herein are limited to statutory subject matter under 35 U.S.C §101.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

ASIC: application specific integrated circuit.
CD: compact disk.
CD-R: CD recordable.
CD-RW: CD rewriteable.
DVD: digital versatile disk and/or digital video disk.
HTTP: hypertext transfer protocol.
LAN: local area network.
RAM: random access memory.
DRAM: dynamic RAM.
SRAM: synchronous RAM.

ROM: read only memory.
PROM: programmable ROM.
EPROM: erasable PROM.
EEPROM: electrically erasable PROM.
USB: universal serial bus.
WAN: wide area network.

An "operable (or operative) connection", or a connection by which entities are "operably (or operatively) connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). An operable connection may include one entity generating data and storing the data in a memory, and another entity retrieving that data from the memory via, for example, instruction control. Logical and/or physical communication channels can be used to create an operable connection. The terms "operable" and "operative", and there various forms, may be used interchangeably herein.

A "data structure", as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from and contain many other data structures (e.g., a database includes many data records). Other examples of data structures are possible as well, in accordance with other embodiments.

"Computer-readable medium" or "computer storage medium", as used herein, refers to a non-transitory medium that stores instructions and/or data configured to perform one or more of the disclosed functions when executed. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, solid state storage device (SSD), flash drive, and other media from which a computer, a processor or other electronic device can function with. Each type of media, if selected for implementation in one embodiment, may include stored instructions of an algorithm configured to perform one or more of the disclosed and/or claimed functions. Computer-readable media described herein are limited to statutory subject matter under 35 U.S.C §101.

"Logic", as used herein, represents a component that is implemented with computer or electrical hardware, a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions. Logic is limited to statutory subject matter under 35 U.S.C. §101.

"User", as used herein, includes but is not limited to one or more persons, computers or other devices, or combinations of these.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described. Thus, this disclosure is intended to embrace alterations, modifications, and variations that fall within the scope of the appended claims, which satisfy the statutory subject matter requirements of 35 U.S.C. §101.

To the extent that the term "includes" or "including" is employed in the detailed description or the claims, it is intended to be inclusive in a manner similar to the term "comprising" as that term is interpreted when employed as a transitional word in a claim.

To the extent that the term "or" is used in the detailed description or claims (e.g., A or B) it is intended to mean "A or B or both". When the applicants intend to indicate "only A or B but not both" then the phrase "only A or B but not both" will be used. Thus, use of the term "or" herein is the inclusive, and not the exclusive use.

To the extent that the phrase "one or more of, A, B, and C" is used herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be used.

What is claimed is:

1. A method implemented by a computing device including at least a processor, the method comprising:
 analyzing, by the processor, access rules corresponding to a first layer in a protocol stack, wherein the protocol stack includes a plurality of layers, wherein the access rules determine, at the first layer, whether network sources are permitted access to the computing device, wherein a first access rule is maintained for the first layer;

generating, by the processor, a filter including dependent access rules based at least in part on combining a plurality of the access rules from the first layer, wherein the dependent access rules include one or more of the same access rules as the plurality of access rules, wherein a first dependent access rule is derived from the first access rule;

assigning, by the processor, the filter including the dependent access rules to a second layer in the protocol stack by implementing the filter including the dependent access rules at the second layer to determine, at the second layer, whether the network sources are permitted access to the computing device;

in response to receiving a packet from a network resource at the second layer, using the first dependent access rule of the filter at the second layer to permit or deny the packet at the second layer; and in response to receiving the packet at the first layer, using the first access rule to permit or deny the packet at the first layer, wherein the dependent access rule of the filter is used at the second layer for filtering the packet before the packet is delivered to the first layer.

2. The method of claim 1, further comprising:
grouping a first set of the access rules into a first group based upon the first set of access rules comprising inclusion rules;
grouping a second set of access rules into a second group based upon the second set of access rules comprising exclusion rules; and
integrating the first set of the access rules and the second set of the access rules to create dependent access rules derived from the access rules of the first layer.

3. The method of claim 1, wherein the first layer comprises at least one first layer feature, and the second layer comprises at least one second layer feature.

4. The method of claim 3, wherein the at least one first layer feature comprises at least one service, and the at least one second layer feature comprises at least one socket.

5. The method of claim 1, wherein analyzing the access rules includes:
sorting the access rules of the first layer according to a layer feature and an access type to form groups of sorted rules;
performing a union operation on at least two groups of the sorted rules to generate data identifying allowed network sources to be allowed access to the computing device at the second layer; and
performing an intersection operation on at least two other groups of the sorted rules to generate data identifying denied network sources to be denied access to the computing device at the second layer.

6. The method of claim 5, wherein the assigning includes integrating the data identifying the allowed network sources with the data identifying the denied network sources to form an access filter for the second layer.

7. The method of claim 1, further comprising:
analyzing the dependent access rules corresponding to the second layer in the protocol stack, wherein the dependent access rules determine, at the second layer, whether the network sources are permitted access to the computing device;
generating second dependent access rules based at least in part on a combination of the dependent access rules from the second layer; and
assigning the second dependent access rules to a third layer in the protocol stack by implementing the second dependent access rules at the third layer to determine, at the third layer, whether the network sources are permitted access to the computing device.

8. The method of claim 7, wherein the first layer is an application layer, the second layer is a session layer, and the third layer is a network layer.

9. The method of claim 7, wherein analyzing the dependent access rules includes:
sorting the dependent access rules of the second layer according to a layer feature and an access type to form groups of sorted rules;
performing a union operation on at least two groups of the sorted rules to generate data identifying allowed network sources to be allowed access to the computing device at the third layer; and
performing an intersection operation on at least two other groups of the sorted rules to generate data identifying denied network sources to be denied access to the computing device at the third layer.

10. The method of claim 9, wherein assigning the second dependent access rules includes integrating the data identifying the allowed network sources with the data identifying the denied network sources to form an access filter for the third layer.

11. A computing system, comprising:
at least one processor;
at least one memory;
a non-transitory computer-readable medium, wherein the at least one memory and the non-transitory computer-readable medium are connected to the processor via at least one communication channel;
an inclusion module, including instructions stored in the non-transitory computer-readable medium that when executed by the at least one processor cause the processor to generate data identifying allowed network sources to be allowed access to the computing system from access rules assigned to a first layer in the protocol stack, wherein a first access rule is maintained for the first layer;
an exclusion module, including instructions stored in the non-transitory computer-readable medium that when executed by the at least one processor cause the processor to generate data identifying denied network sources to be denied access to the computing system from the access rules assigned to the first layer in the protocol stack; and
an integration module, including instructions stored in the non-transitory computer-readable medium that when executed by the at least one processor cause the processor to integrate the data identifying the allowed network sources with the data identifying the denied network sources to form an access filter for the computing system, and to assign the access filter to a second layer in the protocol stack, wherein the first layer is above the second layer in the protocol stack, wherein a first dependent access rule is derived from the first access rule for inclusion within the access filter,
wherein the access filter uses the first dependent access rule at the second layer to permit or deny a packet at the second layer that was received from a network resource, wherein the first access rule is used at the first layer to permit or deny the packet at the first layer, and wherein the dependent access rule of the access filter is used at the second layer for filtering the packet before the packet is delivered to the first layer.

12. The computing system of claim 11, further comprising a database device configured to store at least the access rules assigned to the first layer in the protocol stack.

13. The computing system of claim 11, further comprising a rule sorting module, including instructions stored in the non-transitory computer-readable medium, configured to sort the access rules for the first layer in the protocol stack according to a layer feature and an access type to form groups of sorted rules.

14. The computing system of claim 13, wherein the inclusion module is configured to perform a union operation on at least two groups of the sorted rules to generate the data identifying the allowed network sources, and wherein the exclusion module is configured to perform an intersection operation on at least two other groups of the sorted rules to generate the data identifying the denied network sources.

15. The computing system of claim 11, further comprising a visual programmer interface module, including instructions stored in the non-transitory computer-readable medium, configured to:
provide a graphical user interface; and
facilitate defining and editing of the access rules for the first layer in the protocol stack via the graphical user interface.

16. The computing system of claim 15, further comprising a display screen configured to display and facilitate interactions of a user with at least the graphical user interface.

17. A non-transitory computer-readable medium storing computer-executable instructions that, when executed by a computer, cause the computer to:
analyze a first set of access rules corresponding to a first layer in a protocol stack, wherein the first set of access rules determine, at the first layer, whether network sources are permitted access to a computing device, wherein a first access rule of the first set of access rules is maintained for the first layer;
generating a second set of access rules by combining a plurality of the first set of access rules from the first layer, wherein the second set of access rules include one or more of the same access rules as the plurality of the first set of access rules, wherein the second set of access rules comprises a second access rule derived from the first access rule;
configuring a second layer in the protocol stack with the second set of access rules to cause the computer device to determine, at the second layer, whether the network sources are permitted access to the computing device, wherein the second layer is a lower level than the first layer in the protocol stack;

in response to receiving a packet from a network resource at the second layer, using the second access rule at the second layer to permit or deny the packet at the second layer; and in response to receiving the packet at the first layer, using the first access rule to permit or deny the packet at the first layer, wherein the second access rule is used at the second layer for filtering the packet before the packet is delivered to the first layer.

18. The non-transitory computer-readable medium of claim 17, wherein the instructions for analyzing the first set of access rules include instructions for:
sorting the first set of access rules of the first layer according to a layer feature and an access type to form groups of sorted rules;
performing a union operation on at least two groups of the sorted rules to generate data identifying allowed network sources to be allowed access to the computing device at the second layer; and
performing an intersection operation on at least two other groups of the sorted rules to generate data identifying denied network sources to be denied access to the computing device at the second layer.

19. The non-transitory computer-readable medium of claim 17, wherein the instructions further include instructions for:
analyzing the second set of access rules corresponding to the second layer in the protocol stack, wherein the second set of access rules determine, at the second layer, whether network sources are permitted access to the computing device;
generating a third set of access rules by combining a plurality of the second set of access rules corresponding to the second layer; and
configuring a third layer in the protocol stack with the third set of access rules to cause the computing device to determine, at the third layer, whether the network sources are permitted access to the computing device, wherein the third layer is a lower level than the second layer in the protocol stack.

20. The non-transitory computer-readable medium of claim 19, wherein the instructions for analyzing the second set of access rules include instructions for:
sorting the second set of access rules of the second layer according to a layer feature and an access type to form groups of sorted rules;
performing a union operation on at least two groups of the sorted rules to generate data identifying allowed network sources to be allowed access to the computing device at the third layer; and
performing an intersection operation on at least two other groups of the sorted rules to generate data identifying denied network sources to be denied access to the computing device at the third layer.

* * * * *